(12) United States Patent
Chen (10) Patent No.: US 11,169,646 B2
(45) Date of Patent: Nov. 9, 2021

(54) TOUCH PANEL AND DISPLAY DEVICE (71) Applicant: WUHAN CHINA STAR OPTOELECTRONICS SEMICONDUCTOR DISPLAY TECHNOLOGY CO., LTD., Wuhan (CN)

(72) Inventor: Zesheng Chen, Wuhan (CN)

(*) Notice: Subject to any disclaimer, the term of this patent is extended or adjusted under 35 U.S.C. 154(b) by 0 days.

(21) Appl. No.: 16/753,778

(22) PCT Filed: Dec. 10, 2019

(86) PCT No.: PCT/CN2019/124258
§ 371 (c)(1),
(2) Date: Apr. 5, 2020

(87) PCT Pub. No.: WO2021/082198
PCT Pub. Date: May 6, 2021

(65) Prior Publication Data
US 2021/0132739 A1    May 6, 2021

(30) Foreign Application Priority Data

Nov. 1, 2019  (CN) .......................... 201911061260.9

(51) Int. Cl.
*G06F 3/044* (2006.01)
(52) U.S. Cl.
CPC .......... *G06F 3/0445* (2019.05); *G06F 3/0446* (2019.05)
(58) Field of Classification Search
CPC ............................. G06F 3/0445; G06F 3/0446
See application file for complete search history.

(56) References Cited

U.S. PATENT DOCUMENTS

| 2017/0153724 | A1 | 6/2017 | Hsieh |
| 2018/0373377 | A1 | 12/2018 | Ye |
| 2019/0204953 | A1 | 7/2019 | Min et al. |
| 2020/0185458 | A1* | 6/2020 | Chen ...................... G06F 3/041 |

FOREIGN PATENT DOCUMENTS

| CN | 104133590 A | 11/2014 |
| CN | 104765485 A | 7/2015 |
| CN | 106873835 A | 6/2017 |
| CN | 106940605 A | 7/2017 |
| CN | 109491546 A | 3/2019 |
| CN | 109634459 A | 4/2019 |
| CN | 110362227 A | 10/2019 |

* cited by examiner

*Primary Examiner* — Deeprose Subedi (57) ABSTRACT

A touch panel is provided. The touch panel includes a substrate, a metal mesh, and a touch electrode layer. The substrate includes at least two dielectric layers and a wiring layer disposed between the two dielectric layers. The wiring layer is provided with conductive lines, and the conductive lines are perpendicularly intersected with each other. The conductive lines are disposed below the metal mesh. The touch electrode layer is provided with touch electrodes arranged in an array. A bezel area of the touch panel is not provided with the conductive lines. The conductive lines located in the bezel area of the touch panel are disposed below the metal mesh. The conductive lines are rhombus-shaped. The conductive lines are arranged in an array, and the touch electrodes are electrically connected to the conductive lines through a plurality of first via holes.

15 Claims, 4 Drawing Sheets

TOUCH PANEL AND DISPLAY DEVICE

CROSS REFERENCE TO RELATED APPLICATIONS

The present application claims priority to Chinese Patent Application No. 201911061260.9, entitled "TOUCH PANEL AND DISPLAY DEVICE", and filed on Nov. 1, 2019, the entire disclosure of which is incorporated herein by reference.

FIELD OF THE INVENTION

The present disclosure relates to a field of display, and more particularly to a touch panel and a display device.

BACKGROUND OF THE INVENTION

Figure 1:
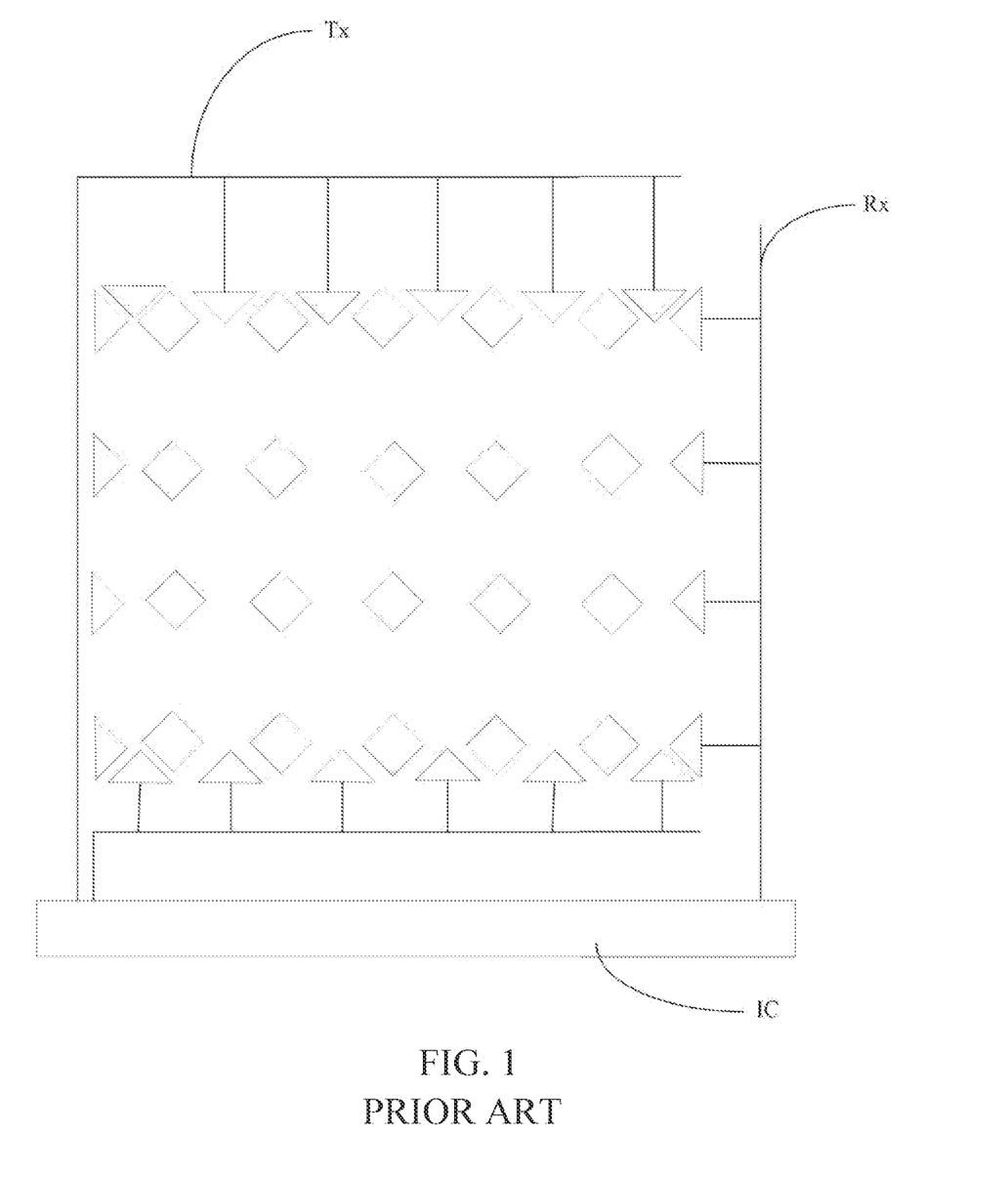
FIG. 1 is a top view of a conventional touch panel.

As shown in FIG. 1, in the conventional direct-panel touch technology, a metal mesh of a touch panel has a large number of metal traces, such that the metal traces in a wiring direction of a touch drive electrode must be applied with voltage at both ends to ensure that the uniformity of the electric field in the wiring direction of the touch drive electrode. The metal traces are connected with a touch circuit on the bottom by way of wiring on the edge position of a touch sensor, so that a narrow bezel cannot be achieved due to a large number of metal traces on the bezel.

That is, the conventional touch panel exist a technical problem that the narrow bezel cannot be achieved because there are a large number of touch lines on the bezel.

SUMMARY OF THE INVENTION

The present disclosure provides a touch panel to solve the technical problem that the narrow bezel cannot be achieved because there are a large number of touch lines on the bezel.

To solve the above problem, the technical solutions provided in the disclosure are as follows:

An embodiment of the present disclosure provides a touch panel, including: a substrate including at least two dielectric layers and a wiring layer disposed between the two dielectric layers, the wiring layer being provided with conductive lines, and the conductive lines being perpendicularly intersected with one another; a metal mesh, the conductive lines being disposed below the metal mesh; a touch electrode layer being provided with touch electrodes arranged in an array; wherein, a bezel area of the touch panel is not provided with the conductive lines, the conductive lines located in the bezel area of the touch panel are disposed below the metal mesh, the conductive lines are rhombus-shaped and arranged in an array, and the touch electrodes are electrically connected to the conductive lines through a plurality of first via holes.

In the touch panel provided in the present disclosure, the substrate includes a first dielectric layer and a second dielectric layer, and the wiring layer includes touch signal receiving lines and touch driving electrode lines, which are disposed on the same layer.

In the touch panel provided in the present disclosure, the substrate includes a first dielectric layer, a second dielectric layer, and a third dielectric layer that are stacked in order; the wiring layer includes touch signal receiving lines and touch driving electrode lines; the touch signal receiving lines are disposed on the first dielectric layer and the second dielectric layer; the touch driving electrode lines are disposed on the second dielectric layer and the third dielectric layer.

In the touch panel provided in the present disclosure, the substrate includes a first dielectric layer, a second dielectric layer, and a third dielectric layer that are stacked in order; the wiring layer includes touch signal receiving lines and touch driving electrode lines; the touch signal receiving lines are disposed on the first dielectric layer and the second dielectric layer; the touch driving electrode lines are disposed on the second dielectric layer and the third dielectric layer.

In the touch panel provided in the present disclosure, the touch signal receiving lines are disposed in a first direction, the touch driving electrode lines are disposed in a second direction, and the first direction and the second direction are perpendicular to each other.

In the touch panel provided in the present disclosure, the touch electrodes at a distal end of the touch electrode layer are electrically connected to the wiring layer through the first via holes. In the touch panel provided in the present disclosure, the wiring layer is directly connected to the touch electrodes at the distal end through the first via holes.

In the touch panel provided in the present disclosure, the conductive lines are electrically connected to wires on the touch electrode layer through the first via holes, and the wires are electrically connected to the touch electrode layer at the distal end.

In the touch panel provided in the present disclosure, the touch panel further includes a touch chip, and the wiring layer is directly electrically connected to the touch chip.

In the touch panel provided in the present disclosure, the touch electrode layer includes a driving sensing electrode layer and a signal sensing electrode layer which are arranged on separate layers, the driving sensing electrode layer is electrically connected through the touch driving electrode lines, and the signal sensing electrode layer is electrically connected through the touch signal receiving lines.

An embodiment of the present disclosure provides a display device including a touch panel, characterized in that the touch panel includes: a substrate including at least two dielectric layers and a wiring layer disposed between the two dielectric layers, the wiring layer being provided with conductive lines, and the conductive lines being perpendicularly intersected with one another; a metal mesh, the conductive lines being disposed below the metal mesh; a touch electrode layer being provided with touch electrodes arranged in an array; wherein, a bezel area of the touch panel is not provided with the conductive lines, the conductive lines located in the bezel area of the touch panel are disposed below the metal mesh, the conductive lines are rhombus-shaped and arranged in an array, and the touch electrodes are electrically connected to the conductive lines through a plurality of first via holes.

In the display device provided in the present disclosure, the substrate includes a first dielectric layer and a second dielectric layer, and the wiring layer includes touch signal receiving lines and touch driving electrode lines, which are disposed on the same layer.

In the display device provided in the present disclosure, the substrate includes a first dielectric layer, a second dielectric layer, and a third dielectric layer that are stacked in order; the wiring layer includes touch signal receiving lines and touch driving electrode lines; the touch signal receiving lines are disposed on the first dielectric layer and the second dielectric layer; the touch driving electrode lines are disposed on the second dielectric layer and the third dielectric layer.

In the display device provided in the present disclosure, the substrate includes a first dielectric layer, a second dielectric layer, and a third dielectric layer that are stacked in order; the wiring layer includes touch signal receiving lines and touch driving electrode lines; the touch driving electrode lines are disposed on the first dielectric layer and the second dielectric layer; the touch signal receiving lines are disposed on the second dielectric layer and the third dielectric layer.

In the display device provided in the present disclosure, the touch signal receiving lines are disposed in a first direction, the touch driving electrode lines are disposed in a second direction, and the first direction and the second direction are perpendicular to each other.

In the display device provided in the present disclosure, the touch electrodes at a distal end of the touch electrode layer are electrically connected to the wiring layer through the first via holes. In the display device provided in the present disclosure, the wiring layer is directly connected to the touch electrodes at the distal end through the first via holes.

In the display device provided in the present disclosure, the conductive lines are electrically connected to wires on the touch electrode layer through the first via holes, and the wires are electrically connected to the touch electrode layer at the distal end.

In the display device provided in the present disclosure, the touch panel further includes a touch chip, and the wiring layer is directly electrically connected to the touch chip.

In the display device provided in the present disclosure, the touch electrode layer includes a driving sensing electrode layer and a signal sensing electrode layer which are arranged on separate layers, the driving sensing electrode layer is electrically connected through the touch driving electrode lines, and the signal sensing electrode layer is electrically connected through the touch signal receiving lines.

Beneficial effect: The present disclosure provides a touch panel and a display device. The touch panel includes a substrate and a touch electrode layer. The substrate includes at least two dielectric layers and a wiring layer disposed between the two dielectric layers. The wiring layer is provided with conductive lines, and the conductive lines are perpendicularly intersected with one another. The conductive lines are disposed below a metal mesh. The touch electrode layer is provided with touch electrodes arranged in an array, wherein the touch electrodes are electrically connected to the conductive lines corresponding to the wiring layer through a plurality of first via holes. In a bezel area, it is only necessary to reserve metal trace positions for shielding external signals, and the conductive lines of the wiring layer can be directly connected to the touch electrode layer and a touch chip, thereby achieving the narrow bezel design and solving the technical problem that the narrow bezel cannot be achieved because there are a large number of touch lines on the bezel.

DESCRIPTION OF THE DRAWINGS

In order to clearly illustrate the embodiments of the present disclosure or the technical solution in the prior art, accompanying drawings for describing the embodiments or the prior art are simply introduced in the following content. Apparently, the accompanying drawings described below are only some embodiments of the present disclosure. A person of ordinary skill in the art, without creative efforts, can derive other drawings from these drawings.

DETAILED DESCRIPTION OF THE PREFERRED EMBODIMENTS

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, structurally similar elements are denoted by the same reference numerals.

Aiming at a technical problem that in a conventional touch panel, a narrow bezel cannot be achieved due to a large number of touch lines on the bezel, the embodiments of the present disclosure can solve the above problem.

Figure 2:
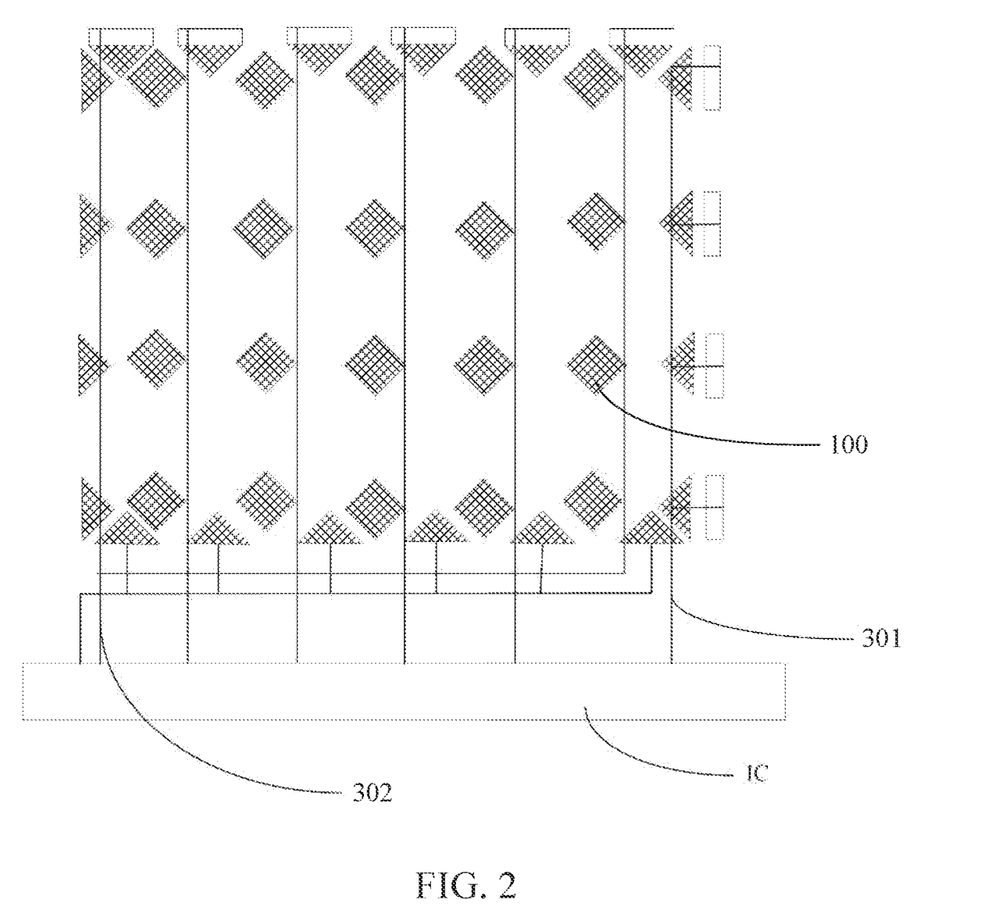
FIG. 2 is a first cross-sectional view of a touch panel provided by the present disclosure.
Figure 3:
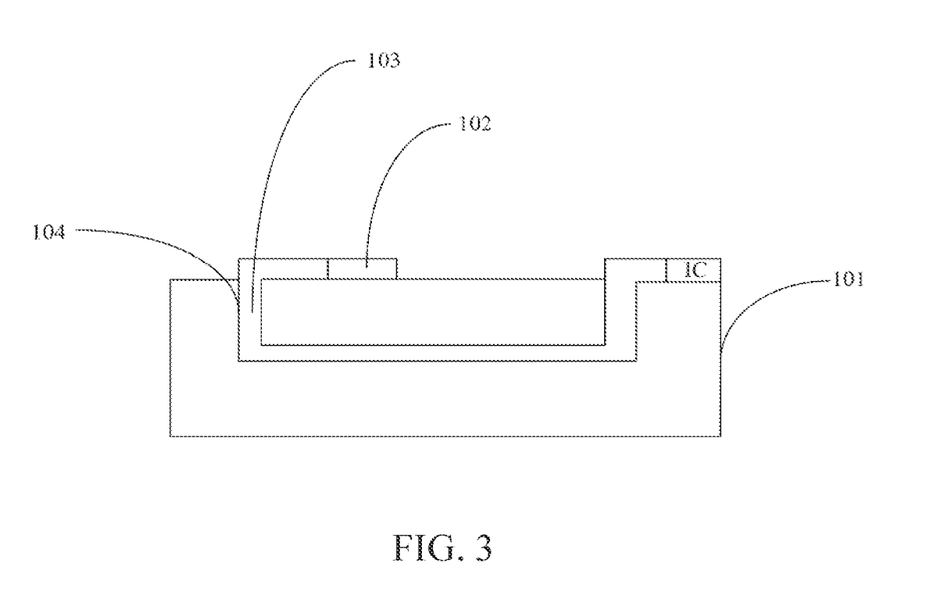
FIG. 3 is a second cross-sectional view of a touch panel provided by the present disclosure.

As shown in FIG. 2 and FIG. 3, the touch panel provided in the disclosure includes a substrate 101 and a touch electrode layer 102. The substrate includes at least two dielectric layers and a wiring layer 103 disposed between the two dielectric layers. The wiring layer is provided with conductive lines, and the conductive lines are perpendicularly intersected with one another. The conductive lines are disposed below a metal mesh 100. The touch electrode layer is provided with touch electrodes arranged in an array. The touch electrodes are electrically connected to the conductive lines through a plurality of first via holes 104.

In the embodiment, the touch panel includes a substrate and a touch electrode layer. The substrate includes at least two dielectric layers and a wiring layer disposed between the two dielectric layers. The wiring layer is provided with conductive lines, and the conductive lines are perpendicularly intersected with one another. The conductive lines are disposed below a metal mesh. The touch electrode layer is provided with touch electrodes arranged in an array, wherein the touch electrodes are electrically connected to the conductive lines corresponding to the wiring layer through a plurality of first via holes. In a bezel area, it is only necessary to reserve metal trace positions for shielding external signals, and the conductive line of the wiring layer can be directly connected to the touch electrode layer and a touch chip, thereby achieving the narrow bezel design and solving the technical problem that the narrow bezel cannot be achieved because there are a large number of touch lines on the bezel.

Figure 4:
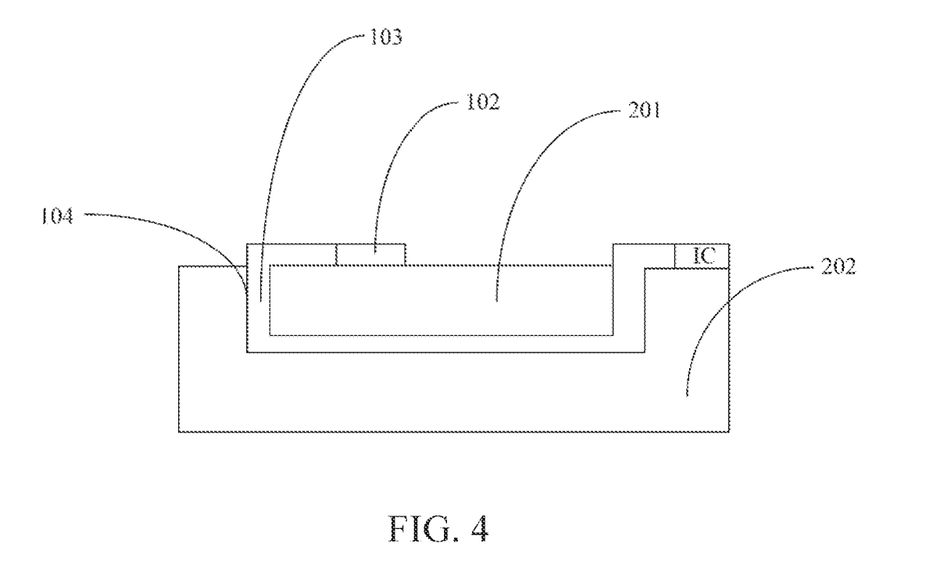
FIG. 4 is a third cross-sectional view of a touch panel provided by the present disclosure.
Figure 5:
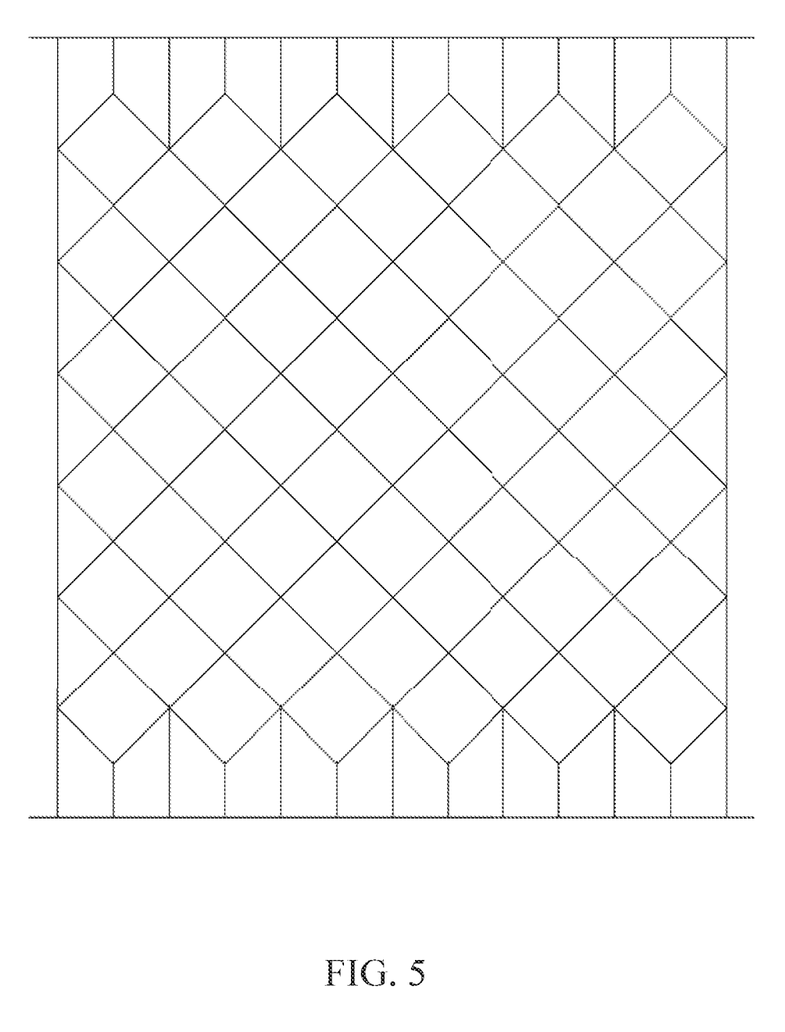
FIG. 5 is a schematic diagram of a touch panel wiring provided by the present disclosure.

In one embodiment, as shown in FIG. 4, the substrate 101 includes a first dielectric layer 201 and a second dielectric layer 202. The wiring layer 103 includes touch signal receiving lines 301 and touch driving electrode lines 302, which are disposed on the same layer. The touch signal receiving lines 301 and the touch driving electrode lines 302 can be bridged to avoid overlapped wiring and achieve the purpose of electrical connection.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch signal receiving lines 301 are disposed on the first dielectric layer 201 and the second dielectric layer 202. The touch driving electrode lines 302 are disposed on the second dielectric layer 202 and the third dielectric layer 203.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are disposed on the second dielectric layer 202 and the third dielectric layer 203.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are also disposed on the first dielectric layer 201 and the second dielectric layer 202. The touch driving electrode lines 302 and the touch signal receiving lines 301 are arranged on separate layers.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are also disposed on the first dielectric layer 201 and the second dielectric layer 202. The touch driving electrode lines 302 and the touch signal receiving lines 301 are arranged on the same layer.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the second dielectric layer 202 and the third dielectric layer 203. The touch signal receiving lines 301 are also disposed on the second dielectric layer 202 and the third dielectric layer 203. The touch driving electrode lines 302 and the touch signal receiving lines 301 are arranged on the same layer.

In one embodiment, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the second dielectric layer 202 and the third dielectric layer 203. The touch signal receiving lines 301 are also disposed on the second dielectric layer 202 and the third dielectric layer 203. The touch driving electrode lines 302 and the touch signal receiving lines 301 are arranged on separate layers.

In one embodiment, the touch signal receiving lines 301 are disposed in a first direction, the touch driving electrode lines 302 are disposed in a second direction, and the first direction and the second direction are perpendicular to each other.

In one embodiment, the touch signal receiving lines 301 are disposed in a first direction, the touch driving electrode lines 302 are disposed in a second direction. The first direction and the second direction have an included angle and the included angle is greater than zero.

In one embodiment, the touch electrodes at the distal end of the touch electrode layer 102 are electrically connected to the wiring layer 103 through the first via holes 104.

In one embodiment, the touch electrodes at the at the distal end of the touch electrode layer 102 are electrically connected to the wiring layer 103 through the first via holes 104, and the other touch electrodes are electrically connected to one another through the conductive lines.

In one embodiment, the wiring layer 103 is directly connected to the touch electrodes at the distal end through the first via holes 104.

In one embodiment, the conductive lines are electrically connected to wires on the touch electrode layer 102 through the first via holes 104, and the wires are electrically connected to the touch electrode layer 102 at the distal end.

In one embodiment, the touch panel further includes a touch chip, and the wiring layer 103 is directly electrically connected to the touch chip.

In one embodiment, the touch electrode layer 102 includes a driving sensing electrode layer and a signal sensing electrode layer that are arranged on separate layers. The driving sensing electrode layer is electrically connected through the touch driving electrode lines 302, and the signal sensing electrode layer is electrically connected through the touch signal receiving lines 301.

In one embodiment, by disposing the wiring layer 103 between the dielectric layers, the metal traces of the bezel are reduced to 0.1 mm.

In one embodiment, a touch circuit further includes scanning lines, and the scanning lines adopt a multiple parallel design.

The display device provided in the disclosure includes a touch panel and a display panel. The touch panel includes a substrate 101 and a touch electrode layer 102. The substrate 101 includes at least two dielectric layers and a wiring layer 103 disposed between the two dielectric layers. The wiring layer 103 is provided with conductive lines. The conductive lines are perpendicularly intersected with one another. The conductive lines are arranged below a metal mesh 100. The touch electrode layer 102 is provided with touch electrodes arranged in an array, wherein the touch electrodes are electrically connected to the conductive lines corresponding to the wiring layer 103 through the first via holes 104.

In this embodiment, the display device includes a touch panel and a display panel. The touch panel includes a substrate 101 and a touch electrode layer 102. The substrate 101 includes at least two dielectric layers and a wiring layer 103 disposed between the two dielectric layers. The wiring layer 103 is provided with conductive lines. The conductive lines are perpendicularly intersected with one another. The conductive lines are arranged below a metal mesh 100. The touch electrode layer 102 is provided with touch electrodes arranged in an array, wherein a bezel area of the touch panel is not provided with the conductive lines. The conductive lines located in the bezel area of the touch panel are disposed below the metal mesh 100. The conductive lines are rhombus-shaped and arranged in an array, and the touch electrodes are electrically connected to the conductive lines corresponding to the wire layer 103 through a plurality of first via holes 104. In the bezel area, it is only necessary to reserve metal trace positions for shielding external signals. The conductive lines of the wiring layer 103 can be directly connected to the touch electrode layer 102 and a touch chip, thereby achieving a narrow bezel design and solving a technical problem that the narrow bezel cannot be achieved because there are a large number of touch lines on the bezel.

In one embodiment, in a display device, the substrate 101 includes a first dielectric layer 201 and a second dielectric layer 202. The wiring layer 103 includes touch signal receiving lines 301 and touch driving electrode lines 302, which are disposed on the same layer. The touch signal receiving lines 301 and the touch driving electrode lines 302 can be bridged to avoid overlapped wiring and achieve the purpose of electrical connection.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch signal receiving lines 301 are disposed on the first dielectric layer 201 and the second dielectric layer 202. The touch driving electrode lines 302 are disposed on the second dielectric layer 202 and the third dielectric layer 203.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are disposed on the second dielectric layer 202 and the third dielectric layer 203.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are also disposed on the first dielectric layer 201 and the second dielectric layer 202. The touch driving electrode lines 302 and the touch signal receiving lines 301 are arranged on separate layers.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the first dielectric layer 201 and the second dielectric layer 202. The touch signal receiving lines 301 are also disposed on the first dielectric layer 201 and the second dielectric layer 202. The touch driving electrode lines 302 and the touch signal receiving lines 301 are arranged on the same layer.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the second dielectric layer 202 and the third dielectric layer 203. The touch signal receiving lines 301 are also disposed on the second dielectric layer 202 and the third dielectric layer 203. The touch driving electrode lines 302 and the touch signal receiving lines 301 are arranged on the same layer.

In one embodiment, in a display device, the substrate 101 includes a first dielectric layer 201, a second dielectric layer 202, and a third dielectric layer 203 that are stacked in order. The wiring layer 103 includes touch signal receiving lines 301 and touch driving electrode lines 302. The touch driving electrode lines 302 are disposed on the second dielectric layer 202 and the third dielectric layer 203. The touch signal receiving lines 301 are also disposed on the second dielectric layer 202 and the third dielectric layer 203. The touch driving electrode lines 302 and the touch signal receiving lines 301 are arranged on separate layers.

In one embodiment, in a display device, the touch signal receiving lines 301 are disposed in a first direction, the touch driving electrode lines 302 are disposed in a second direction, and the first direction and the second direction are perpendicular to each other.

In one embodiment, in the display device, the touch signal receiving lines 301 are disposed in a first direction and the touch driving electrode lines 302 are disposed in a second direction. The first direction and the second direction have an included angle and the included angle is greater than zero.

In one embodiment, in a display device, the touch electrodes at the at the distal end of the touch electrode layer 102 are electrically connected to the wiring layer 103 through the first via holes 104.

In one embodiment, in a display device, the touch electrodes at the at the distal end of the touch electrode layer 102 are electrically connected to the wiring layer 103 through the first via holes 104, and the other touch electrodes are electrically connected with one another through the conductive lines.

In one embodiment, in a display device, the wiring layer 103 is directly connected to the touch electrodes at the distal end through the first via holes 104.

In one embodiment, in a display device, the conductive lines are electrically connected to wires on the touch electrode layer 102 through the first via holes 104, and the wires are electrically connected to the touch electrode layer 102 at the distal end.

In one embodiment, in a display device, the touch panel further includes a touch chip, and the wiring layer 103 is directly electrically connected to the touch chip.

In one embodiment, in a display device, the touch electrode layer 102 includes a driving sensing electrode layer and a signal sensing electrode layer that are arranged on separate layers. The driving sensing electrode layer is electrically connected through the touch driving electrode lines 302, and the signal sensing electrode layer is electrically connected through the touch signal receiving lines 301.

In one embodiment, in a display device, by disposing the wiring layer 103 between the dielectric layers, the metal traces of a bezel are reduced to 0.1 mm.

In one embodiment, in a display device, a touch circuit further includes scanning lines, and the scanning lines adopt a multiple parallel design.

The present disclosure provides a touch panel including a substrate, a metal mesh and a touch electrode layer. The substrate includes at least two dielectric layers and a wiring layer disposed between the two dielectric layers. The wiring layer is provided with conductive lines, and the conductive lines are perpendicularly intersected with one another. The conductive lines are disposed below the metal mesh. The touch electrode layer is provided with touch electrodes arranged in an array, wherein a bezel area of the touch panel is not provided with the conductive lines. The conductive lines located in the bezel area of the touch panel are disposed below the metal mesh. The conductive lines are rhombus-shaped and arranged in an array, and the touch electrodes are electrically connected to the conductive lines corresponding to the wire layer 103 through a plurality of first via holes 104. In the bezel area, the conductive lines of the wiring layer 103 can be directly connected to the touch electrode layer 102 and a touch chip, thereby achieving a narrow bezel design and solving a technical problem that in a conventional touch panel, the narrow bezel cannot be achieved due to a large number of touch lines on the bezel.

Based on the above, the present disclosure has been described with a preferred embodiment thereof, but the above preferred embodiment is not to limit the scope of the present disclosure. Those skilled in the art may make many changes and modifications to the described embodiments without departing from the scope and the spirit of the present disclosure that is intended to be limited only by the appended claims.

What is claimed is:

1. A touch panel including:
   a substrate including at least two dielectric layers and a wiring layer disposed between the two dielectric layers, the wiring layer being provided with conductive lines, and the conductive lines being perpendicularly intersected with one another;
   a metal mesh, the conductive lines being disposed below the metal mesh;
   a touch electrode layer being provided with touch electrodes arranged in an array;
   wherein, a bezel area of the touch panel is not provided with the conductive lines, the conductive lines are disposed below the metal mesh, the conductive lines are rhombus-shaped and arranged in an array, and the touch electrodes are electrically connected to the conductive lines through a plurality of first via holes,
   wherein the substrate includes a first dielectric layer, a second dielectric layer, and a third dielectric layer that are stacked in order; the wiring layer includes touch signal receiving lines and touch driving electrode lines; the touch signal receiving lines are disposed on the first dielectric layer and the second dielectric layer; and the touch driving electrode lines are disposed on the second dielectric layer and the third dielectric layer.

2. The touch panel as claimed in claim 1, wherein the touch signal receiving lines are disposed in a first direction, the touch driving electrode lines are disposed in a second direction, and the first direction and the second direction are perpendicular to each other.

3. The touch panel as claimed in claim 1, wherein the touch electrodes at a distal end of the touch electrode layer are electrically connected to the wiring layer through the first via holes.

4. The touch panel as claimed in claim 3, wherein the wiring layer is directly connected to the touch electrodes at the distal end through the first via holes.

5. The touch panel as claimed in claim 3, wherein the conductive lines are electrically connected to wires on the touch electrode layer through the first via holes, and the wires are electrically connected to the touch electrode layer at the distal end.

6. The touch panel as claimed in claim 1, wherein the touch panel further includes a touch chip, and the wiring layer is directly and electrically connected to the touch chip.

7. The touch panel as claimed in claim 1, wherein the touch electrode layer includes a driving sensing electrode layer and a signal sensing electrode layer which are arranged on separate layers, the driving sensing electrode layer is electrically connected through the touch driving electrode lines, and the signal sensing electrode layer is electrically connected through the touch signal receiving lines.

8. A display device including a touch panel, wherein the touch panel includes:
   a substrate including at least two dielectric layers and a wiring layer disposed between the two dielectric layers, the wiring layer being provided with conductive lines, and the conductive lines being perpendicularly intersected with one another;
   a metal mesh, the conductive lines being disposed below the metal mesh;
   a touch electrode layer being provided with touch electrodes arranged in an array;
   wherein, a bezel area of the touch panel is not provided with the conductive lines, the conductive lines are disposed below the metal mesh, the conductive lines are rhombus-shaped and arranged in an array, and the touch electrodes are electrically connected to the conductive lines through a plurality of first via holes,
   wherein the substrate includes a first dielectric layer, a second dielectric layer, and a third dielectric layer that are stacked in order; the wiring layer includes touch signal receiving lines and touch driving electrode lines; the touch driving electrode lines are disposed on the first dielectric layer and the second dielectric layer; and the touch signal receiving lines are disposed on the second dielectric layer and the third dielectric layer.

9. A display device including a touch panel, wherein the touch panel includes:
   a substrate including at least two dielectric layers and a wiring layer disposed between the two dielectric layers, the wiring layer being provided with conductive lines, and the conductive lines being perpendicularly intersected with one another;
   a metal mesh, the conductive lines being disposed below the metal mesh;
   a touch electrode layer being provided with touch electrodes arranged in an array;
   wherein, a bezel area of the touch panel is not provided with the conductive lines, the conductive lines are disposed below the metal mesh, the conductive lines are rhombus-shaped and arranged in an array, and the touch electrodes are electrically connected to the conductive lines through a plurality of first via holes,
   wherein the substrate includes a first dielectric layer, a second dielectric layer, and a third dielectric layer that are stacked in order; the wiring layer includes touch signal receiving lines and touch driving electrode lines; the touch signal receiving lines are disposed on the first dielectric layer and the second dielectric layer; the touch driving electrode lines are disposed on the second dielectric layer and the third dielectric layer.

10. The display device as claimed in claim 8, wherein the touch signal receiving lines are disposed in a first direction, the touch driving electrode lines are disposed in a second direction, and the first direction and the second direction are perpendicular to each other.

11. The display device as claimed in claim 8, wherein the touch electrodes at a distal end of the touch electrode layer are electrically connected to the wiring layer through the first via holes.

12. The display device as claimed in claim 11, wherein the wiring layer is directly connected to the touch electrodes at the distal end through the first via holes.

13. The display device as claimed in claim 11, wherein the conductive lines are electrically connected to wires on the touch electrode layer through the first via holes, and the wires are electrically connected to the touch electrode layer at the distal end.

14. The display device as claimed in claim 8, wherein the touch panel further includes a touch chip, and the wiring layer is directly and electrically connected to the touch chip.

15. The display device as claimed in claim 8, wherein the touch electrode layer includes a driving sensing electrode layer and a signal sensing electrode layer which are arranged on separate layers, the driving sensing electrode layer is electrically connected through the touch driving electrode lines, and the signal sensing electrode layer is electrically connected through the touch signal receiving lines.

\* \* \* \* \*